United States Patent
Boccacci

(10) Patent No.: US 7,254,258 B2
(45) Date of Patent: *Aug. 7, 2007

(54) PERIPHERAL DEVICE FOR ACQUIRING BIOMETRIC AND PERSONAL DATA PARTICULARLY FOR PREPARING RECOGNITION DOCUMENTS

(75) Inventor: Roberto Boccacci, Rome (IT)

(73) Assignee: Italdata Ingegneria Dell'Idea S.p.A., Rome (IT)

( * ) Notice: This patent issued on a continued prosecution application filed under 37 CFR 1.53(d), and is subject to the twenty year patent term provisions of 35 U.S.C. 154 (a)(2).

Subject to any disclaimer, the term of this patent is extended or adjusted under 35 U.S.C. 154(b) by 754 days.

(21) Appl. No.: 10/399,144

(22) PCT Filed: Oct. 11, 2001

(86) PCT No.: PCT/IT01/00516

§ 371 (c)(1),
(2), (4) Date: Apr. 14, 2003

(87) PCT Pub. No.: WO02/33664

PCT Pub. Date: Apr. 25, 2002

(65) Prior Publication Data

US 2004/0032975 A1 Feb. 19, 2004

(30) Foreign Application Priority Data

Oct. 16, 2000 (IT) ......................... RM2000A0549
Jan. 29, 2001 (IT) ......................... RM20010012 U

(51) Int. Cl.
*G06K 9/00* (2006.01)

(52) U.S. Cl. ...................... 382/118; 361/600; 361/679

(58) Field of Classification Search ............... 382/100, 382/115, 118; 396/30, 429; 348/333.06; 711/100, 103; 361/600, 679, 683, 684; 358/906; 345/531; 370/229, 235, 236

See application file for complete search history.

(56) References Cited

U.S. PATENT DOCUMENTS

| 3,679,198 A | * | 7/1972 | Weggeland .................... 269/3 |
| 4,993,068 A | | 2/1991 | Piosenka et al. |
| 5,095,196 A | | 3/1992 | Miyata |
| 5,268,963 A | * | 12/1993 | Monroe et al. ............. 713/186 |
| 5,563,956 A | * | 10/1996 | Nishikawa et al. ......... 382/118 |
| 5,724,544 A | * | 3/1998 | Nishi ......................... 711/115 |
| 6,314,196 B1 | * | 11/2001 | Yamaguchi et al. ........ 382/125 |
| 6,322,655 B1 | * | 11/2001 | Casagrande ................. 156/257 |
| 7,010,701 B1 | * | 3/2006 | Bossemeyer, Jr. et al. .. 711/173 |

FOREIGN PATENT DOCUMENTS

| EP | 0 440 814 A | 8/1991 |
| EP | 0 652 505 A1 | 5/1995 |
| EP | 0 730 243 | 9/1996 |

(Continued)

*Primary Examiner*—Sheela Chawan
(74) *Attorney, Agent, or Firm*—Nixon & Vanderhye PC

(57) ABSTRACT

A peripheral device for the acquisition of biometric and personal data comprises, in a single casing, a device for recognizing an operator and authorizing the use of the equipment; a first video camera for taking live pictures of a person requesting the document; a second video camera for the acquisition of personal characteristics shown on a card; a fingerprint reader; and a video source switch.

17 Claims, 16 Drawing Sheets

| | FOREIGN PATENT DOCUMENTS | | WO | 99/16025 A | * | 4/1999 |
|----|----|----|----|----|----|----|
| TW | 307 849 | 6/1997 | WO | 00/28485 A | | 5/2000 |
| TW | 325 545 | 1/1998 | | | | |
| WO | 98/18106 A | 4/1998 | * cited by examiner | | | |

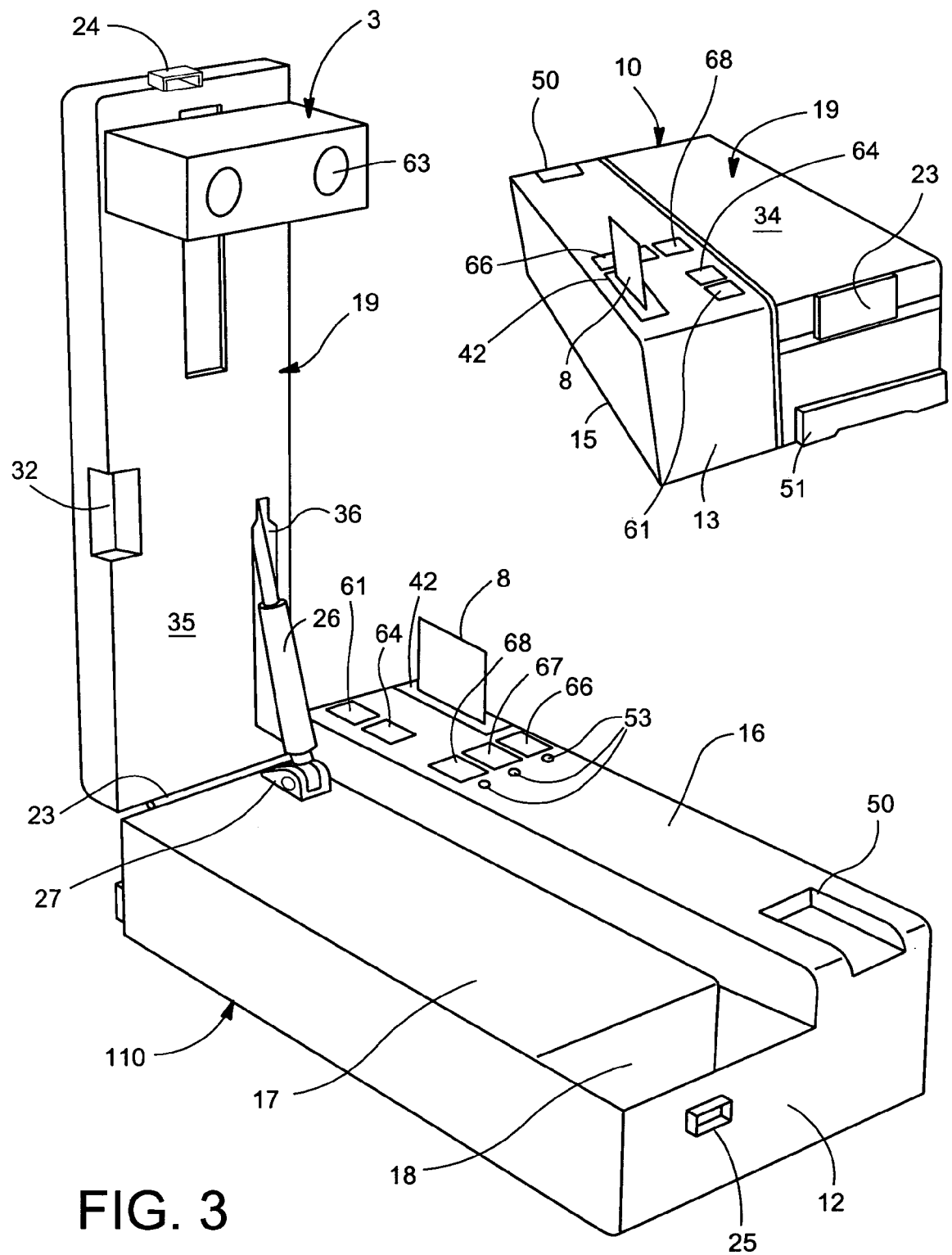

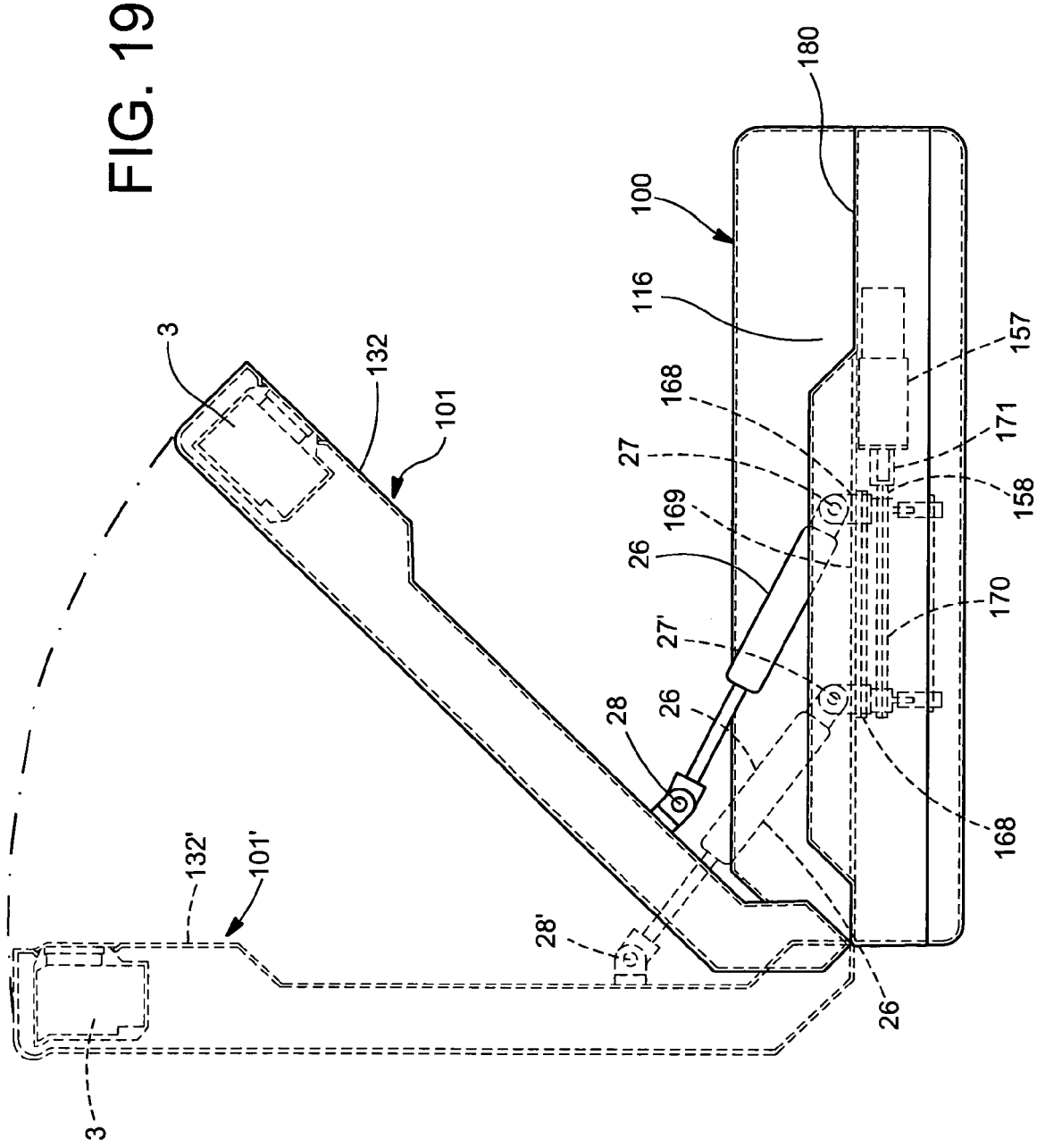

PERIPHERAL DEVICE FOR ACQUIRING BIOMETRIC AND PERSONAL DATA PARTICULARLY FOR PREPARING RECOGNITION DOCUMENTS

The present invention relates to a peripheral device for acquiring biometric and personal data, which, in particular, acts as an interface device with a main computer for the preparation of recognition documents such as identity cards.

At the present time, the production of an identity card, preferably in the form of a laser card, but without excluding other types such as smart cards, chip cards or the like, requires a computer and a multiplicity of peripheral devices, such as a fingerprint reader, a scanner for acquiring personal characteristics such as a signature, a video camera for storing the image of the face of the person requesting the document, at least one smart card reader/writer, a printer for badges or cards which are generally made from plastic material, and a laser card reader/writer for storing the required data in a corresponding optical strip on one side of the card.

An example of a device of this kind is discolsed in U.S. Pat. No. 5,268,963.

This large number of peripherals has to be located in the vicinity of the computer where the operator is seated, the operator being responsible for acquiring the data directly from the person requesting the identity document.

Each peripheral has to be connected for operation to the computer and has to be provided with the corresponding power supply connection. Because of the quantity and type of connections, it is necessary to use additional cards, such as multi-port cards, which have to be fitted in the main computer, and/or other devices, such as those known as HUB USB (hub universal serial bus) (universal serial buses with connecting panels), outside the computer.

In all cases, the area adjacent to the operator is encumbered with a multiplicity of devices of different kinds and their connecting cables which are used for the transmission of signals, the input of commands, and the power supply.

WO 99 16025 discloses a biometric identification device in a single housing comprsing a biometric scanner and a camera. However, said prior art document provides general suggestions for a portable integrated apparatus.

WO 98 18106 discloses a not portable installation for producing a personalized user identification card.

The present invention was designed to overcome the aforementioned drawback and is based on the discovery that it is useful to keep the devices for acquiring data from the person requesting the document separate from the devices used for producing the document itself.

The invention is therefore intended to provide a compact and easily used piece of equipment, located within a casing to make it easily transportable. The user, in other words the person having the task of acquiring the biometric and personal data, will be enabled to use the equipment without any problems of incompatibility with equipment already in his possession. The user may be a local register office, responsible for issuing identity cards, or another government office, or a health authority, a penal institution, or the like.

In particular, one object of the invention is to provide a modular piece of equipment with individual connections for the transmission of data to the main computer and for the power supply.

Another object of the invention is to make it possible to acquire a photograph either by directly photographing the person to be identified, or by means of a photo card for dedicated use, in particular, with the equipment according to the present invention.

A further object is to provide equipment according to the invention provided with a device for recognizing the operator of the equipment, in order to prevent fraudulent use.

Yet another object of the invention is to print a recognition card for the person requesting it, particularly for the operator who is to carry out the data acquisition.

The present invention provides a peripheral device for acquiring biometric and personal data, which, in particular, acts as an interface device with a main computer for the preparation of recognition documents such as identity cards, comprising, in a single casing, a smart card reader/writer device;

a first video camera for the live photography of a person requesting the document;

an external lighting unit adjacent to the first video camera;

a second video camera, acting as a scanner, located inside the casing, for the acquisition of personal characteristics shown on a card which can be inserted into a guide and support frame fixed inside the casing in front of the second camera, through an entry slot formed in the casing;

an internal lighting unit adjacent to the second video camera, for illuminating the card;

a video source switch for switching the signals from the first video camera and the second video camera, a power supply unit operated by a switch and connected to a distributor of power to the recognition device, and to the first and second video cameras;

a data connector for the connection to the main computer.

The present invention will now be described with reference to its embodiments, it being understood that variations may be made to these embodiments without departure from the scope of protection of the present invention, and with reference to the figures of the attached drawing, in which:

FIG. 2 shows a schematic perspective view of the peripheral device in a first embodiment, in the closed configuration;

FIG. 3 shows a schematic perspective view of the peripheral device of FIG. 2, in the open configuration;

FIG. 19 shows, in a side view, a third variant of the second embodiment of the peripheral device.

Figure 1:
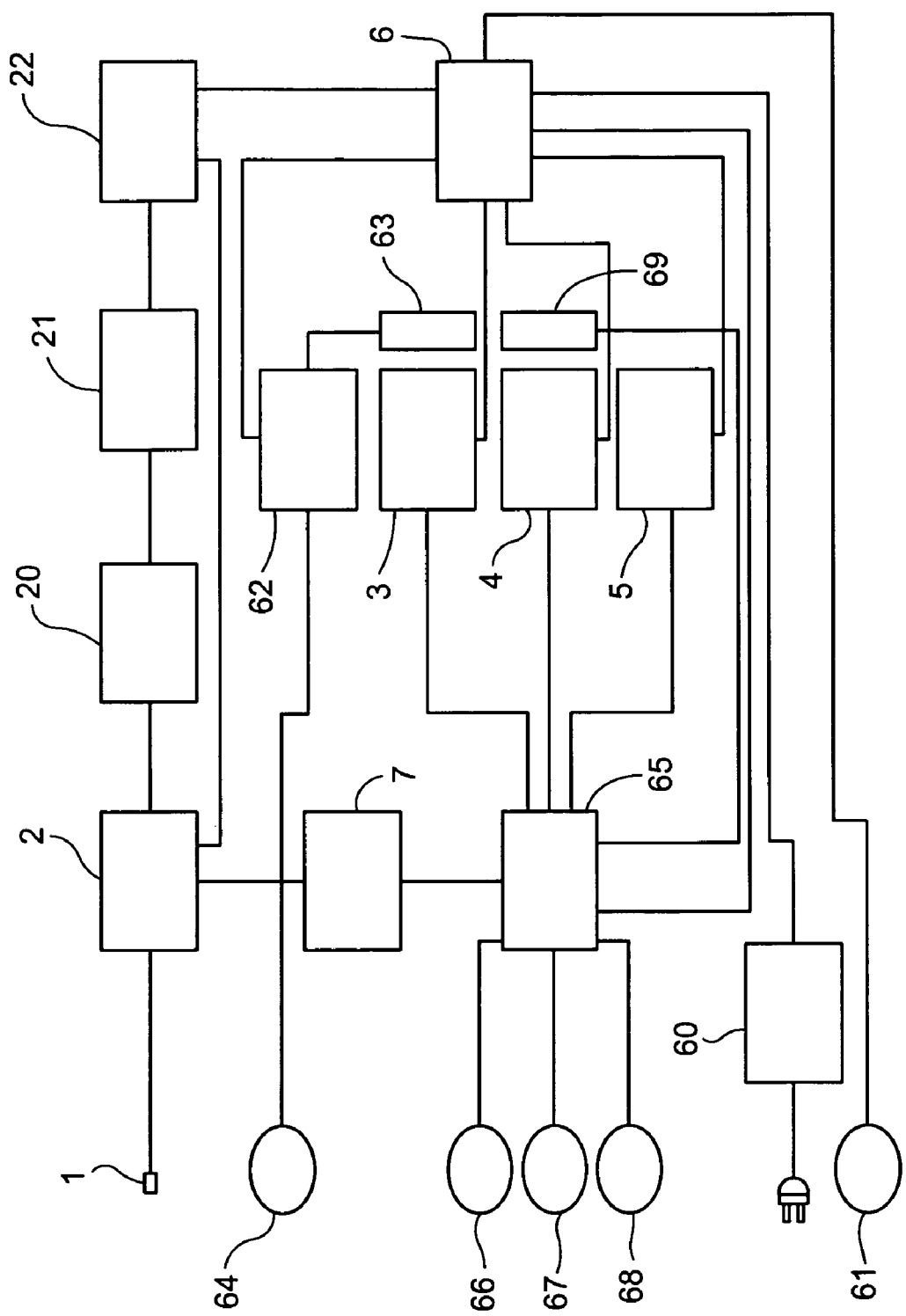
FIG. 1 shows a block diagram of the components of the peripheral device according to the present invention.

With reference to the drawings, FIG. 1 shows in a block diagram the general configuration of the peripheral device according to the invention for acquiring biometric and personal data, this device acting as an interface with a main computer. The main computer is not shown, but it can be imagined as being connected through a data connector, indicated by 1, joined to the block 2, which represents a HUB USB (universal serial bus with connecting panel). The HUB USB is connected for operation in a loop with a device for recognizing the operator and authorizing him for use of the equipment and/or for writing (initialization of the data on the person requesting the document). This device comprises, in a conventional way, a smart card writer/reader (block 20) connected to an electrically operated smart card swipe device (block 21) and to a corresponding smart card release device (block 22). The smart card reader/writer (block 20) can be, for example, the GemPC430 type made by GEMPLUS, France.

A first video camera (block 3) is provided in the peripheral according to the invention for the live photography of a person requesting the document, to produce a photograph in card format. Alternatively, the block 3 can represent a digital camera.

The block 4 represents a second video camera, acting as a scanner, for the acquisition of personal characteristics such as a signature and a previously prepared photo card.

Advantageously, a fingerprint reader can be provided, as indicated in the block 5. The first video camera, the second video camera and the fingerprint reader are connected for power supply to a power supply distributor (block 6) of a direct-current power supply unit (block 60) connected to the mains. The power supply distributor is operated by a switch-on command (block 61) comprising a switch and a light-emitting diode for monitoring purposes. The power supply distributor (block 6) is connected not only to the first video camera, the second video camera and the fingerprint reader, but also to a lighting timer (block 62) for the first video camera, this timer being connected both to a lighting unit (block 63) and to an operating button (block 64). The power supply distributor (block 6) is additionally connected to the smart card release device (block 22) and to a video source switch (block 65) which receives the signals from the first video camera (block 3), from the second video camera (block 4) and from the fingerprint reader (block 5) according to the corresponding push-button command and as indicated by LEDs (blocks 66, 67 and 68). A command is sent from the video source switch block 65 to the lighting unit (block 69) of the second video camera, to automate the switching on of the lights. A USB leads from the video source switch (block 65) to a PAL/NTSC video digitizer (block 7) and then to the HUB USB (block 2).

Alternatively, instead of being operated by push buttons as described, the switch can automatically carry out the switching between the different video sources by means of suitable software.

A first embodiment of the peripheral according to the invention is shown in FIGS. 2 to 6. In these figures, similar numbers indicate components corresponding to the blocks indicated above.

These components are contained in a casing 10, which is preferably portable. The casing 10 is of parallelepipedal shape. As shown in particular in FIGS. 2 to 4, the casing includes a base 11, a front wall 12, a rear wall 13, and side walls 14 and 15.

In the currently preferred embodiment, the casing 10 has a raised portion 16 and a stepped lowered portion 17 on its upper face. The lowered portion 17 has a void 18 at its front, so that it essentially forms a downward-facing L-shape. The lowered portion is designed to receive a folding arm 19 of parallelepipedal shape when the peripheral device is in the closed position. The folding arm 19 is pivoted at the rear, by means of a hinge 23, on the rear wall 13 of the casing.

In the closed position, the upper surface 34 of the folding arm 19 is preferably coplanar with the upper surface of the raised portion 16 of the casing. A first video camera 3 is fitted on the lower surface 35 of the folding arm 19, so that, when the folding arm 19 is rotated upwards through 90°, the video camera 3 faces towards the person requesting the document, who has to be photographed to enable a photograph of him to be stored in card format. In the dosed position, the video camera 3 is located in the front void 18 of the casing and is suitably protected, together with its lighting elements 63 which are described below. In this position, locking means, of the lever type for example, indicated schematically by 24 in the folding arm 19 and by 25 in the front wall 12 of the casing, interact to keep the folding arm 19 horizontal. The vertical position of the folding arm, which thus acts as a camera stand, is preferably maintained by a gas spring 26 pivoted between the upper face of the casing and the folding arm, by the hinges 27 and 28 respectively. In the operating position of the video camera 3, the gas spring 26 is accommodated in a cavity 36 shaped to match it, formed in the folding arm 19. The gas spring 26 is shown in this position in broken lines and indicated by 26'. Clearly, alternative forms of articulation to the gas spring type can be provided.

Figure 4:
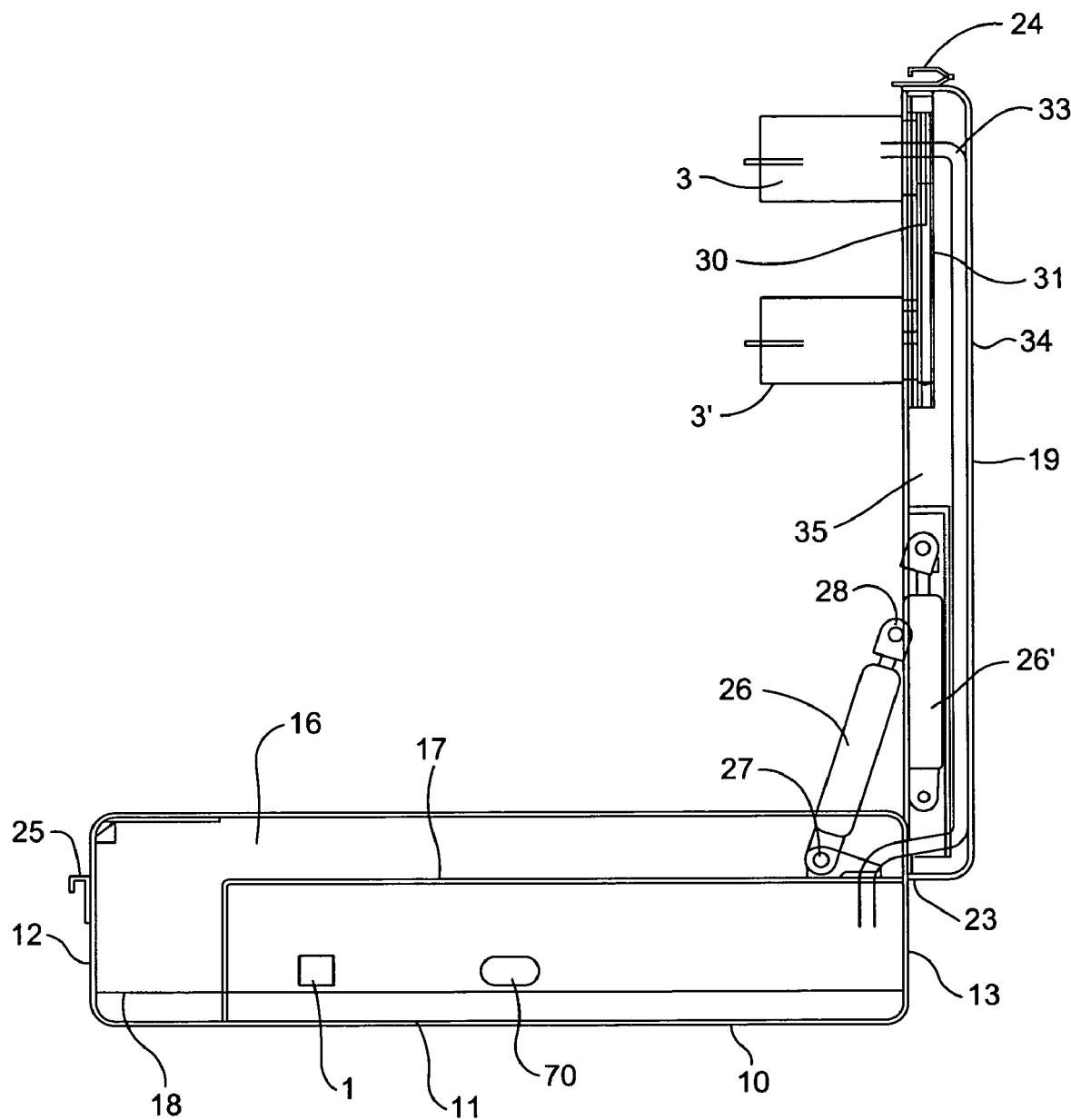
FIG. 4 shows a schematic side view of the first embodiment of the peripheral device, in the open configuration, with parts shown in broken lines when they are in alternative positions.

Advantageously, the first video camera 3 is mounted on a slider 30, shown schematically in FIG. 4, slidable in a guide 31 housed in the folding arm 19. The slider 30 is operated in a conventional way, for example via a rack and pinion which are not shown, with a knob 32 for adjusting the vertical position of the video camera to match the height of the subject to be photographed. A different position of the video camera 3 is shown in broken lines at 3'. The height of the video camera can be adjusted by a servo-assisted method. The cables of the video camera are indicated by 33.

The first video camera 3 is associated with the corresponding lighting elements 63, operated by means of the corresponding push button 64 and a timer (indicated in block 62 of FIG. 1 but not shown in detail), for the live photography of the person requesting the document.

A second video camera 4, acting as a scanner, is provided inside the casing of the peripheral according to the present invention, for the acquisition of the personal characteristics of the person requesting the document.

These personal characteristics, such as the signature or a previously prepared photograph in card format, are shown on only one side, or alternatively on both sides, of a backing card indicated by 8 in FIGS. 2 and 3 and described in greater detail below with reference to FIG. 7.

Figure 5:
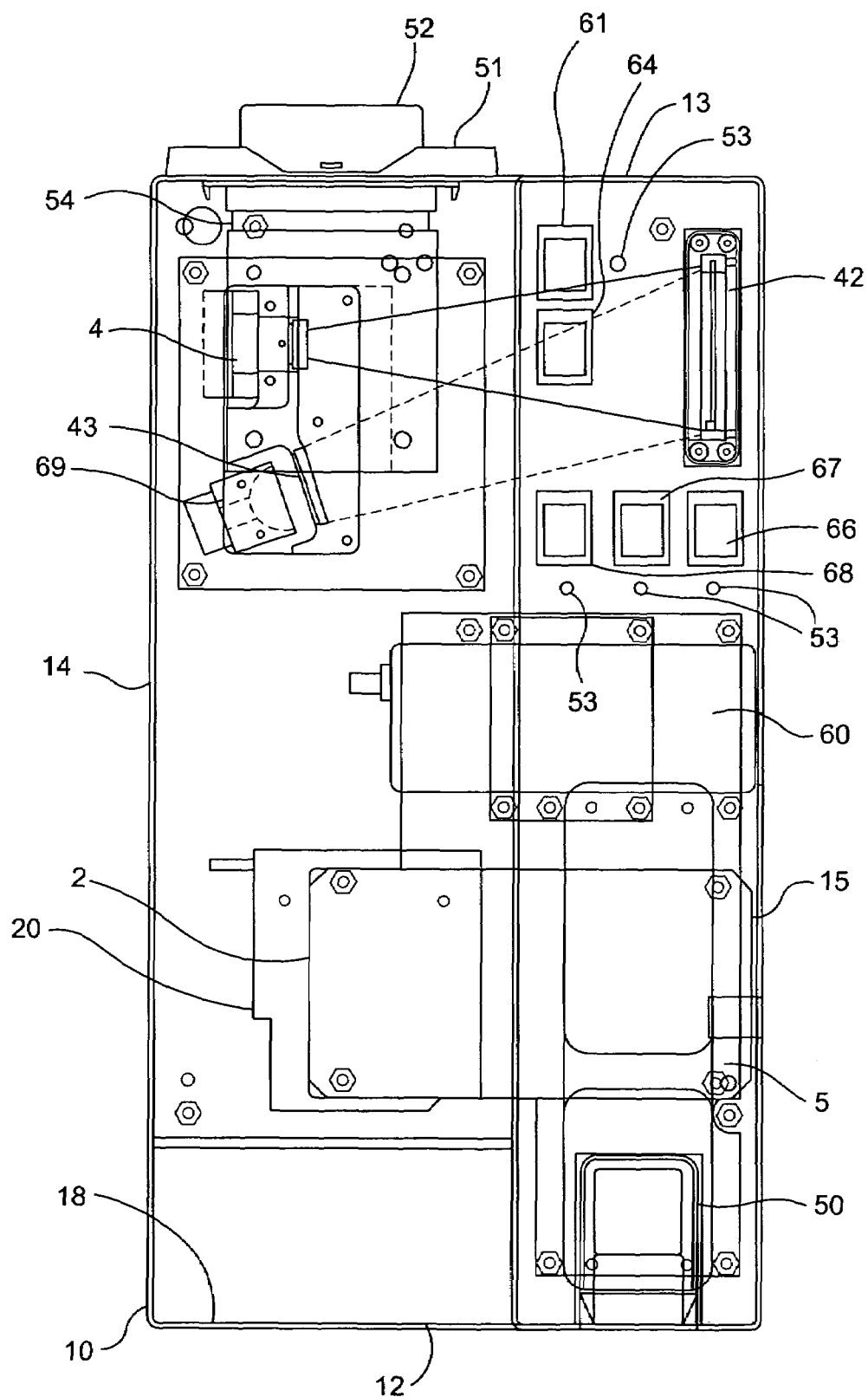
FIG. 5 shows a schematic plan view from above of the peripheral device of FIG. 4, shown on an enlarged scale, with the various levels of the interior shown as if transparent and without the folding arm.
Figure 6:
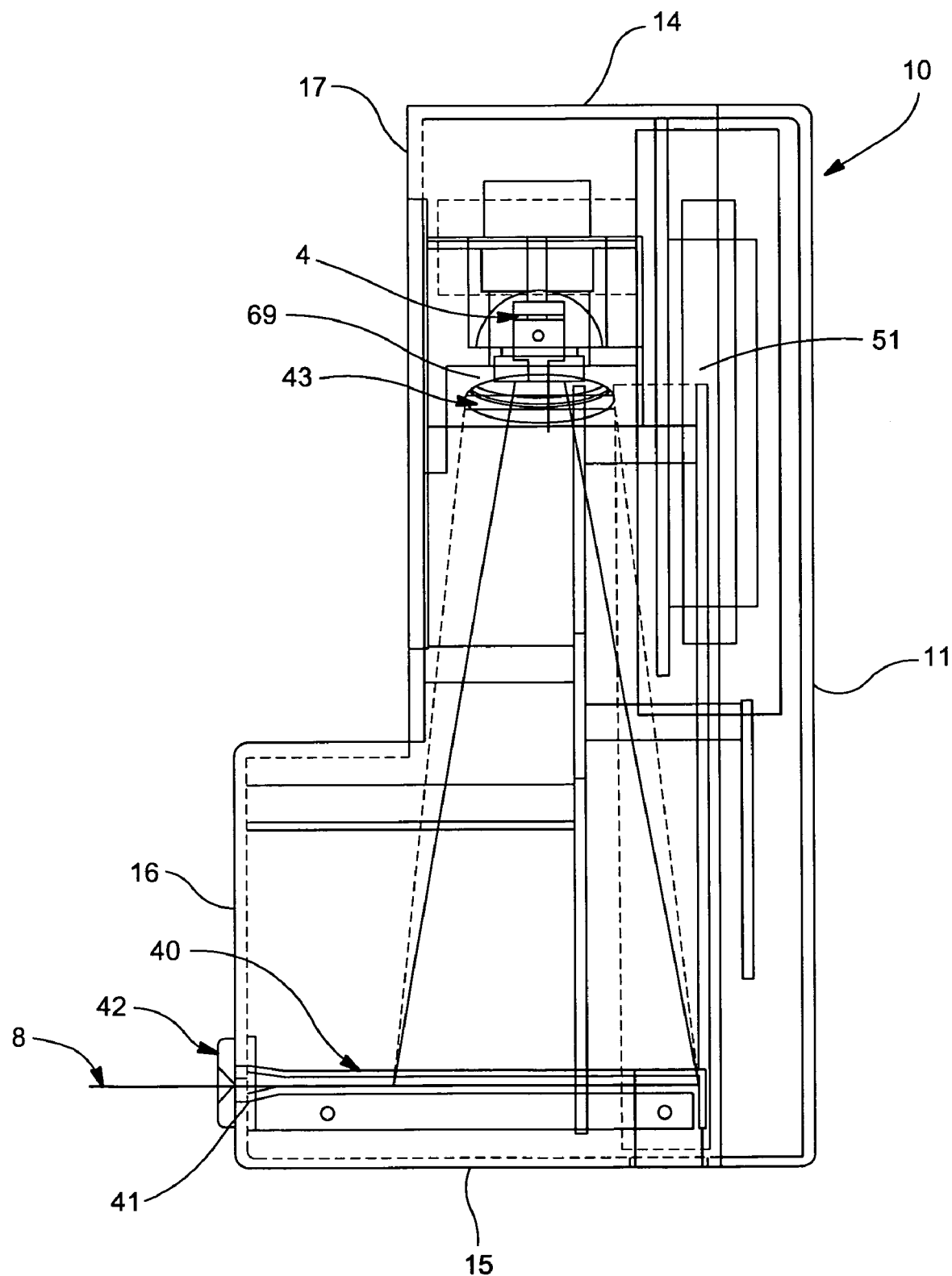
FIG. 6 shows a schematic lateral rear view of the peripheral device of FIG. 5, shown on an additionally enlarged scale, with the various levels of the interior shown as if transparent and without the folding arm.

A second video camera scanner 4 is shown in FIGS. 5 and 6, which are, respectively, a plan view from above and a lateral rear view of the peripheral according to the present invention.

The video camera scanner 4, which can be of any type available on the market, is placed in front of a guide and support frame 40 for the card 8, fixed inside the casing which has an aperture 41 and an insertion slot 42 at the position of the frame 40. The lighting unit 69, provided with an optical filter 43, for illuminating the card 8 is positioned adjacent to the video camera scanner 4.

Advantageously, the fingerprint reader 5, whose reading device is indicated by 50 in FIGS. 2, 3 and 5, is provided in the casing of the peripheral.

The signals from the first video camera 3, from the second video camera 4 and from the fingerprint reader 5 are sent to the video source switch (block 65 of FIG. 1) which is operated by operating buttons 66, 67 and 68 for the first video camera, the second video camera and the fingerprint reader respectively, this operation being indicated by the corresponding light-emitting diodes. The push buttons can usefully be located at the rear of the device, for convenient operation by the operator. The command for switching on the lighting unit 69 is sent from the same switch. Alternatively, as stated above, the switch can automatically carry out the switching between the different video sources, by means of suitable software.

FIGS. 2, 5 and 6 also show a slot 51 for the insertion of a smart card, indicated by 52 in FIG. 5.

The slot 51 is connected to the smart card reader/writer 54 described above with reference to blocks 20, 21 and 22. This smart card reader/writer 54 can be used as a device for recognizing and authorizing the operator, and in this case the smart card consists of the operator's card which is read by the reader/writer 54. Alternatively, the smart card reader/writer 54 can be used for writing a recognition document for the person requesting it.

FIG. 5 shows the power supply unit 60 connected to the mains via a power supply connector 70 (FIG. 4) operated by a switch 61, located at the rear, and connected to the power supply distributor (block 6) which is not shown in further detail, through which the recognition device, the lighting timer for the first video camera, the second video camera and its lighting unit, the fingerprint reader, and the video source switch are supplied.

Figure 7:
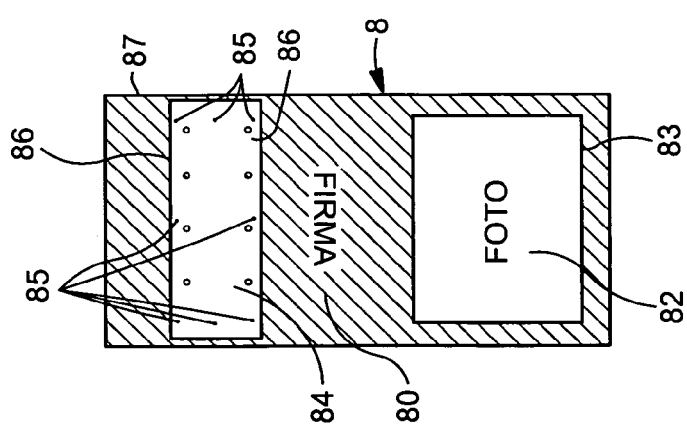
FIG. 7 shows a plan view of a first example of a card used with the peripheral device according to the present invention.

As shown in detail in FIG. 7, the backing card 8 for the video-digital reproduction of a photograph and a signature used in producing the recognition document is made from card material, preferably card which is sufficiently rigid to be inserted without bending into the guide and support frame 40 through the insertion slot 42. Clearly, any other suitable material, preferably one which is equally economical, can be used in place of the card.

A generally rectangular area 82 is provided on the obverse of the backing card for the application of the photograph of the person requesting the identity document. The area 82 of the photograph is delimited by a frame 83, which contains in a suitable way the text "PHOTO". There is also an area 84 delimited by a dotted border 85 for the application of the signature of the person requesting the document. This area is indicated by the text "SIGNATURE" which is inverted to show the requesting person the direction in which the signature is to be written, this being the same as the direction of insertion of the card into the slot of the peripheral. The dotted border 85 indicates that the signature must not extend beyond it, to avoid not being digitized by the video camera of the peripheral.

The face of the card outside the areas 82 and 84 is surrounded by a background field 80 shown schematically by hatching in FIG. 7. Clearly, the background field is formed by coloring the obverse of the card with a color different from the preferably white color of the signature and photograph areas. This background field can be formed by hatching, dotting or the like, in such a way that the person requesting the document is immediately made to understand that nothing must be entered in this area. The text "SIGNATURE" is also in a color which contrasts with the background field.

Advantageously, the signature area 84 can be extended above or below with rectangular border areas 86 and 87, which are preferably white as is the signature area 4. These areas are useful when the backing card 1 is not inserted accurately into the guide and support frame of the peripheral. In this case, the video camera would also photograph part of the background field, leading to inaccurate digitization. The presence of the areas 86 and 87 avoids such an occurrence.

The area 2 for application of the photograph is preferably covered with an adhesive substance protected by a removable flap to facilitate insertion into the slot without obstruction. For application of the photograph of the person requesting the document, the flap is removed to expose the adhesive surface in an appropriate way. Alternatively, the photograph can be applied to the card with staples. The person requesting the document writes his signature on the same side of the card as the photograph, or on the opposite side, in a delimited area (which is also omitted from the drawings).

Figure 9:
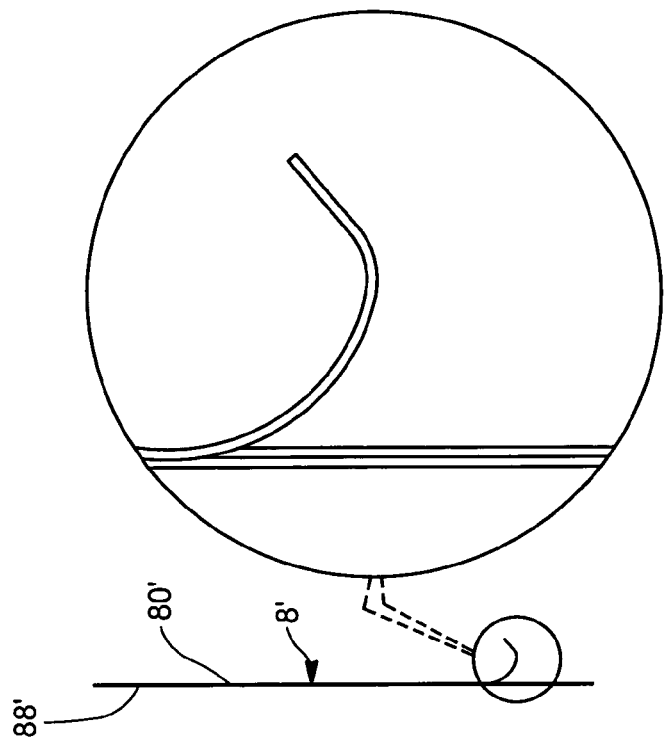
FIG. 9 shows a side view of the card of FIG. 8.
Figure 8:
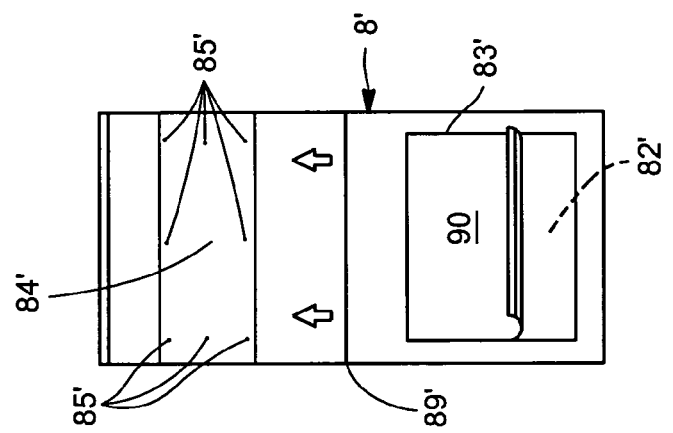
FIG. 8 shows a plan view of a second example of a card used with the peripheral device according to the present invention.

FIGS. 8 and 9 show a second example of a backing card. The backing card 8' is made from laminated material, comprising a bottom card layer 88', on which is applied a layer of adhesive substance (not indicated by a reference number) and a top layer 80', which is essentially a layer which can be peeled from the bottom layer 88' on which it is exactly superimposed. The top layer 80' has a separating cut, indicated by the broken line 82' and formed along the perimeter of a rectangle 90, having the same dimensions as the photograph to be applied, within a frame 83'. To apply the photograph, it is simply necessary (as will be stated in a suitable printed note) to remove the rectangle 82' from the top layer 80' and attach the photograph there, using the layer of adhesive substance, with the subject's face centred in the frame 83'.

On the top layer 80' there is, as in the first example of a card shown in FIG. 7, an area 84' delimited by a dotted border 85' in which the person requesting the document is to write his signature. The direction of signing is indicated by the arrows appearing in the dark space 89', accompanied if necessary by an appropriate sentence giving instructions for use.

When the peripheral device according to the invention is in use, the data for the person requesting the document are acquired by the peripheral by means of the first video camera 3, if a photograph in card format is not provided, by means of the second video camera 4 for the signature and any photograph, and by means of the fingerprint reader 5.

If a photograph and a signature to be stored are provided, the card 8 (or 8') on which they are applied is inserted into the insertion slot 42 and scanned on one side only, taken out, turned round, and scanned again on the same side.

As shown in FIG. 1, the video data from the first video camera 3, the second video camera 4 and the fingerprint reader 5 are switched by means of the buttons 66, 67 and 68 respectively, and displayed by the corresponding LEDs, indicated in a general way by 53. The switch 65 sends the video data to the digitizer 7, and from there to the HUB USB 2 and to the main computer (not shown) through the data connector 1.

Figure 10:
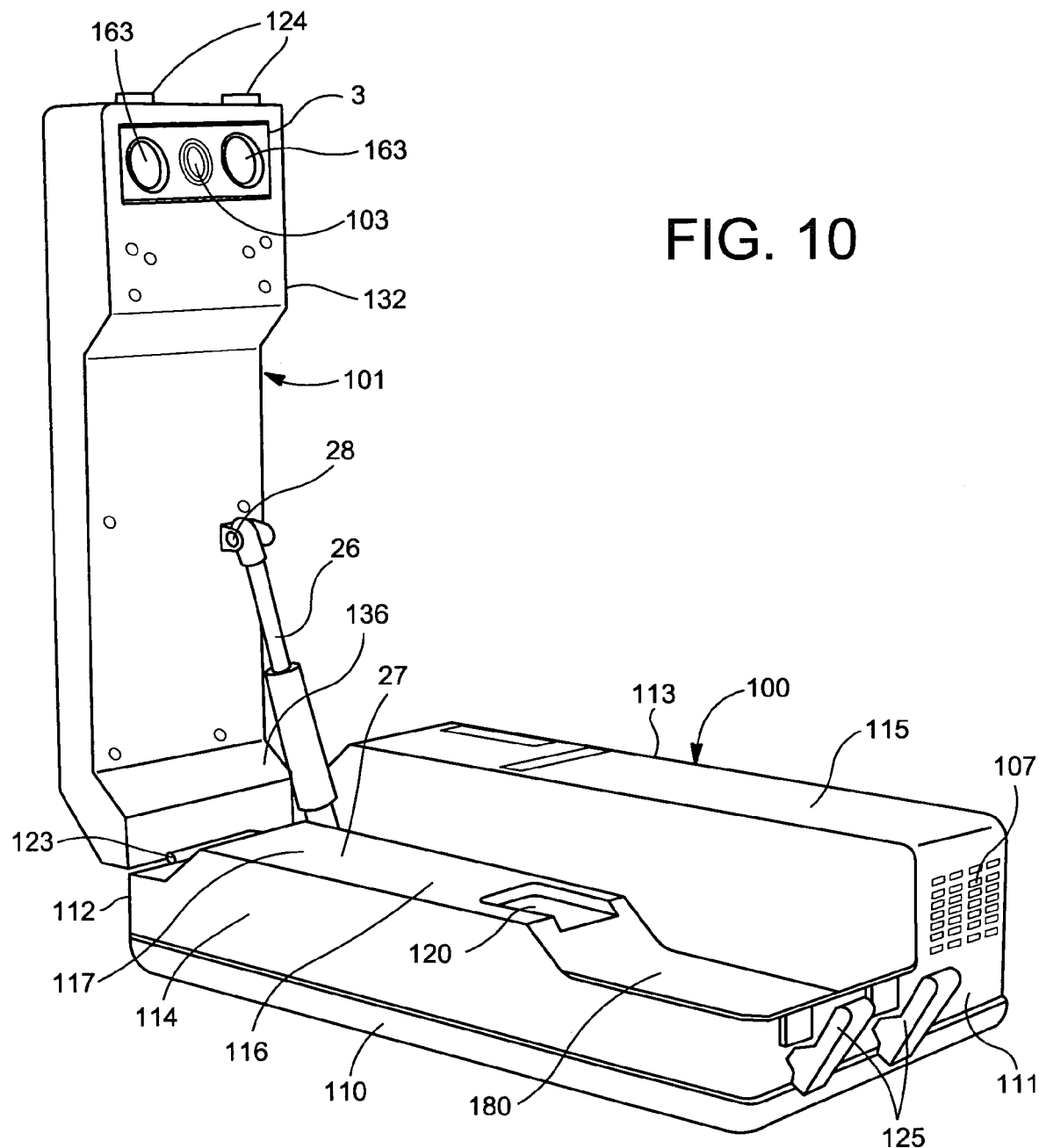
FIG. 10 shows a perspective view of a second embodiment of the peripheral device, in the open configuration.
Figure 11:
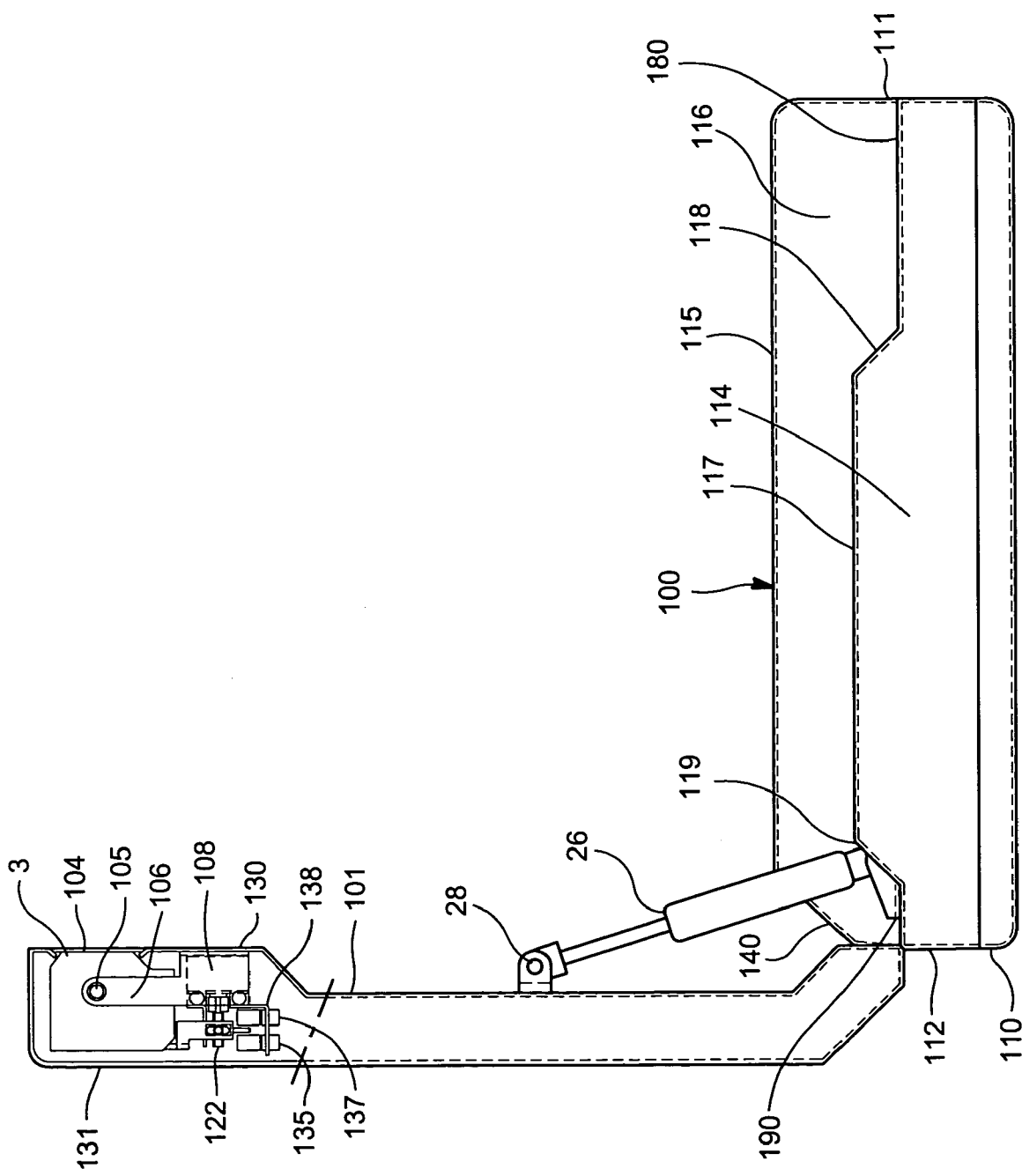
FIG. 11 shows a schematic side view of the second embodiment of the peripheral device, in partial section in the area of the first video camera.

A second embodiment will now be described with reference to FIGS. 10 to 16, in which similar numbers are used to indicate parts similar to those of the first embodiment of the invention. In particular, FIG. 10 shows a general view of the second embodiment of the peripheral device, whose functional components, essentially identical to those of the first embodiment described above, are contained in a portable casing 100. The casing 100, of a similarly parallelepipedal shape, is shown in FIGS. 10 and 11, and FIG. 14, in the open and closed configurations respectively. The casing 100 includes a base 110, a front wall 111, a rear wall 112, and side walls 113 and 114.

On its upper face, the casing 100 has a raised portion 115 and a lowered portion 116. The lowered portion 116 has a projecting portion 117 connected at both ends, by ramp portions 118 and 119, to a front recess 180 and a rear recess 190. The projecting portion 117 houses a fingerprint reader, shown schematically in broken lines and identified by the number 102 in FIGS. 14 and 15, longitudinally within the casing 100. The projecting portion 117 has in its front part a horizontally positioned panel 120 for reading the fingerprint of a person requesting the document.

The lowered portion 116 of the upper face of the casing 100 receives a folding arm 101 which is made essentially in the shape of a brace symbol. The folding arm 101 is pivoted by means of a horizontal hinge 123 on the rear wall 112 of the casing 100.

The upper surface 131 of the folding arm 101, in the closed position, is preferably coplanar with the upper surface of the raised portion 115 of the casing 100. A first video camera 3 having a built-in lighting unit 163 and a lens 103, both facing an aperture 104 on the opposite side to the upper surface 131, near the free end of the folding arm 101 and in a projecting thickened portion thereof. Consequently, when the folding arm 101 is rotated upwards through 90°, the lens of the video camera 3 is aimed towards the person requesting the document, who is located in front of the equipment and has his photograph taken so that a photograph of him in card format can be stored. In the closed position, the video camera 3 is located in the front recess 180 of the lowered portion 116. In this position, shown in FIG. 14, locking means, of the lever type for example, shown in FIG. 10 and indicated schematically by 124 in the folding arm 101 and by 125 in the front wall 111 of the container 100, interact to keep the folding arm 101 horizontal regardless of the position of the casing 100. The casing 100 can be closed at all times.

The folding arm 101 is held in the vertical position by an opposing action, preferably provided by a gas spring 26 pivoted between the upper face of the lowered portion 116 of the casing 100 and the folding arm 101, on the pivots 27 and 28 respectively. In the closed position of the folding arm 101, the pivot 27 of the gas spring 26 is accommodated in a cavity 136 shaped to match it and formed in the folding arm 101 (FIG. 10).

Figure 12:
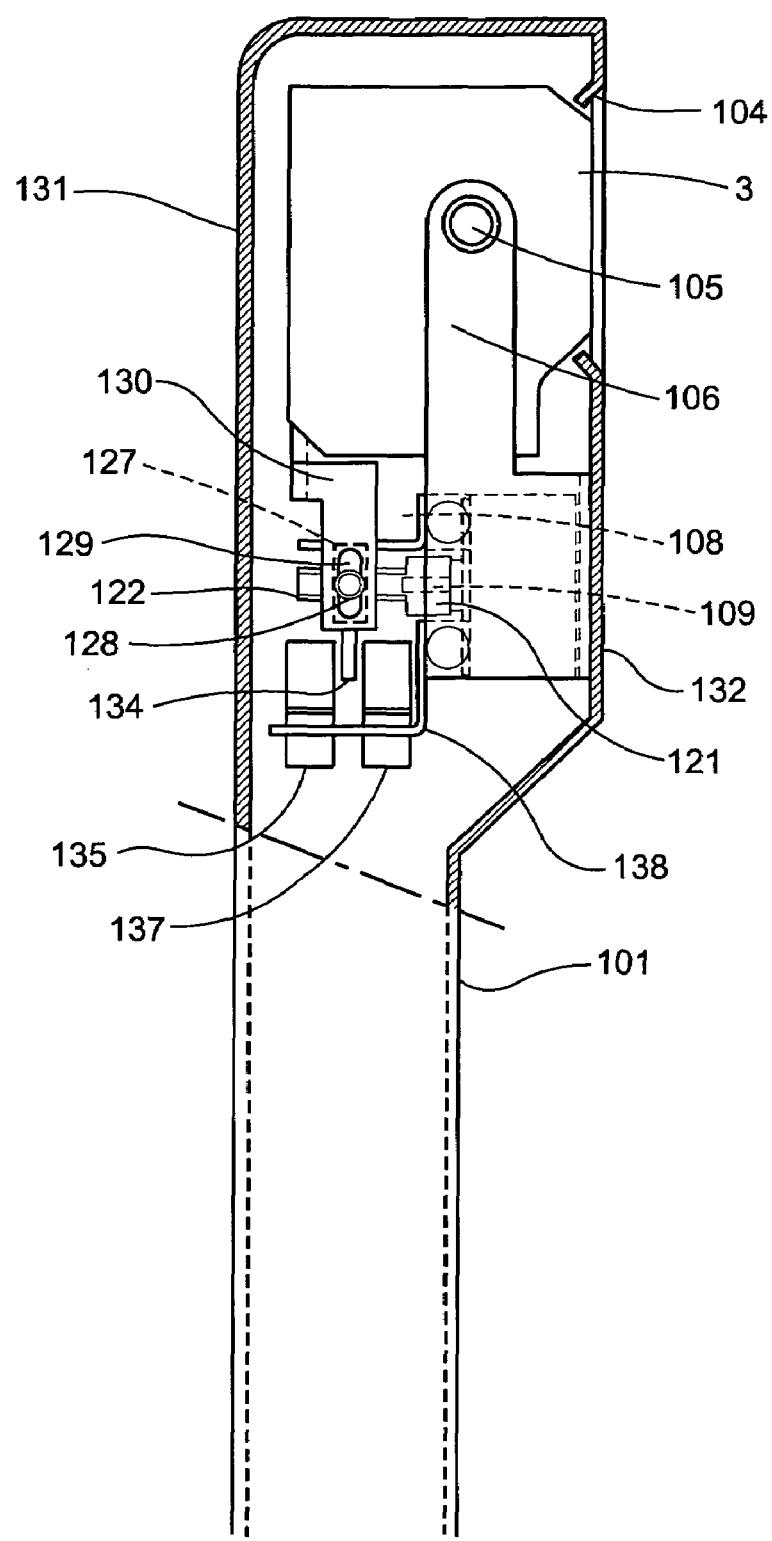
FIG. 12 shows a partial enlarged section through the peripheral device of FIG. 11 in the area of the first video camera.
Figure 13:
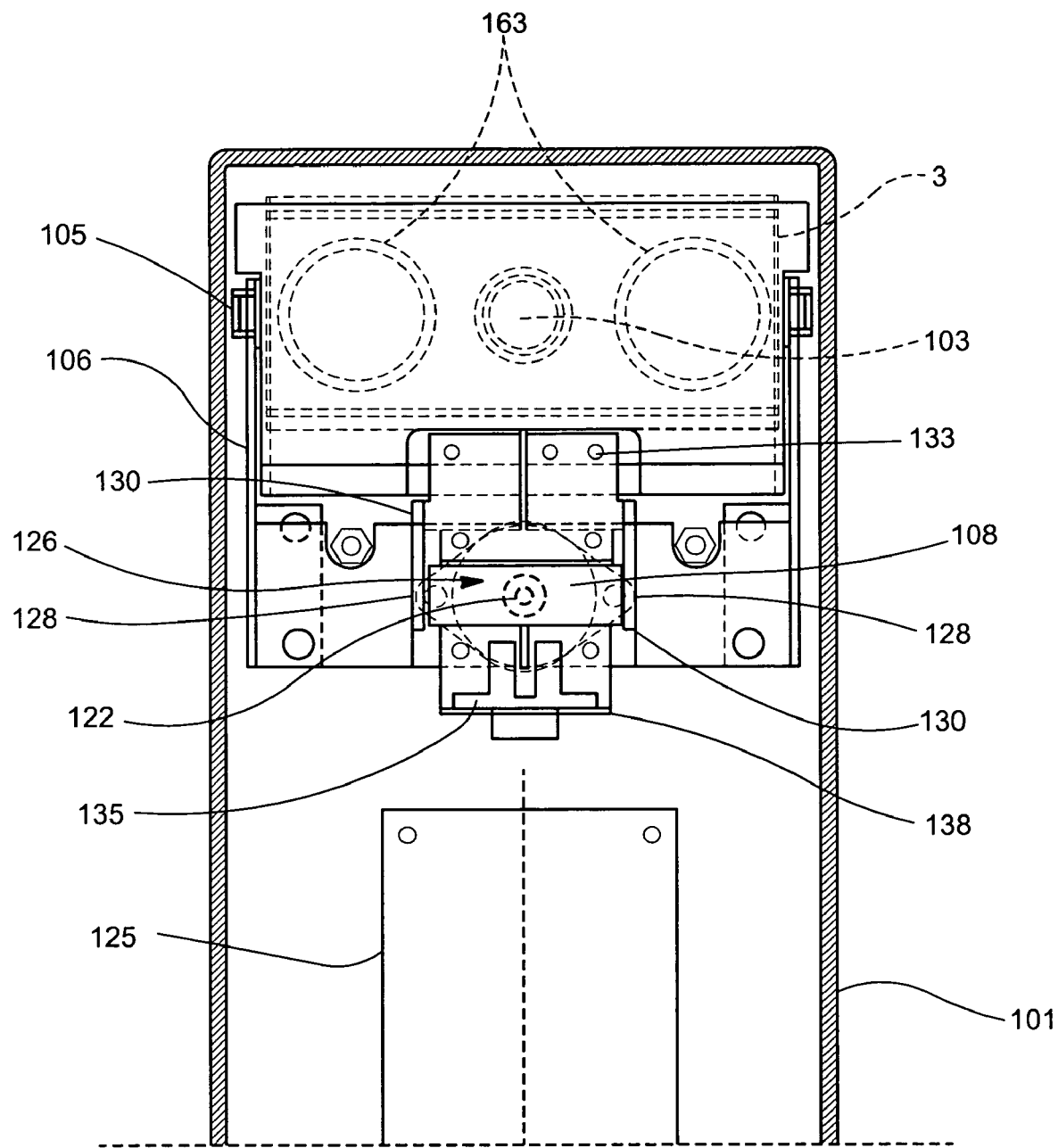
FIG. 13 shows an enlarged section, viewed from the rear, through the peripheral device of FIG. 11 in the area of the first video camera.
Figure 14:
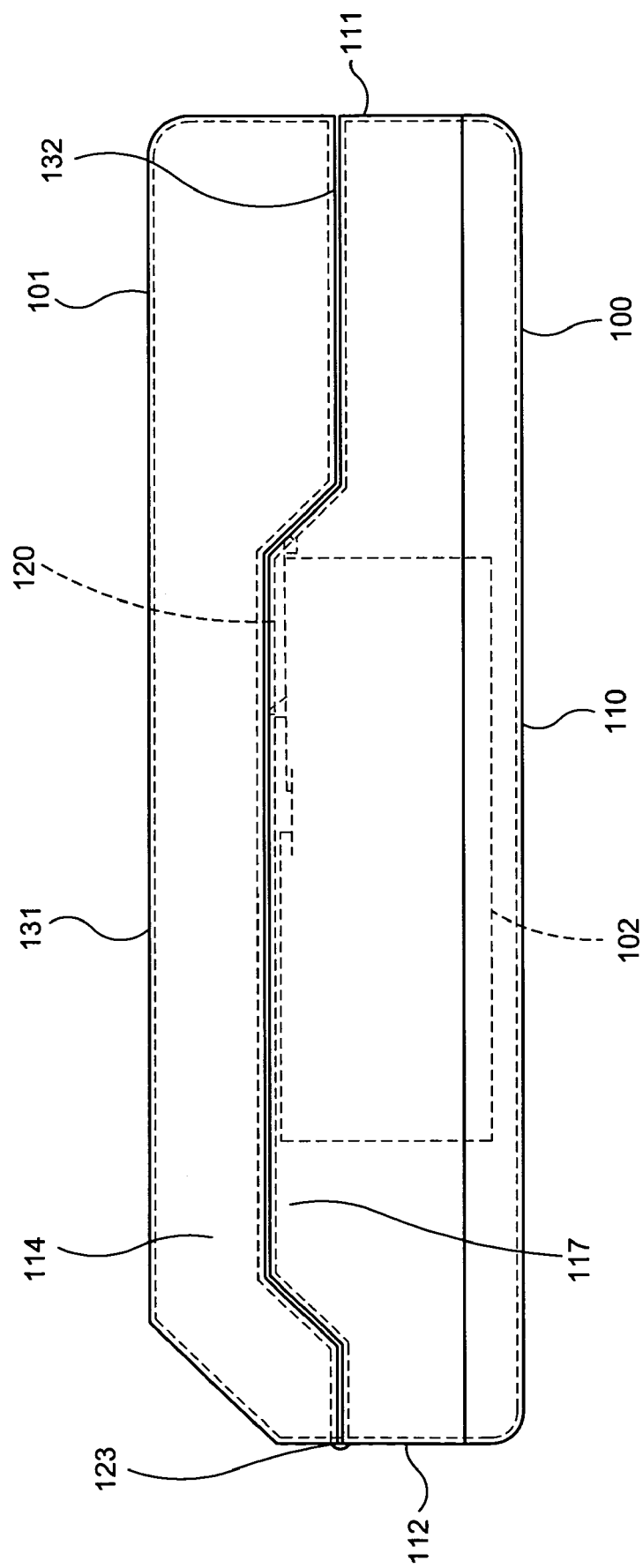
FIG. 14 shows a schematic side view of the second embodiment of the peripheral device of FIG. 10, in the closed configuration.

As shown in FIG. 11, and in greater detail in FIGS. 12 and 13, the first video camera 3 according to the invention is mounted so that it can be orientated about an axis parallel to that of the hinge 123, by means of a pivot 105 supported by a support bracket 106 inside the projecting thickened portion 132 of the folding arm 101. The angle of orientation of the video camera 3 is preferably ±10° to the horizontal. The video camera 3 is orientated by means of a motor 108 made integral by means of the support bracket 106 with the projecting portion 132 of the folding arm 101. The motor must be of the stepping type, because of the limited space available for it.

The shaft 109 of the motor 108 is connected by a joint 121 to an endless screw 122. The motor 108 is operated via a printed control circuit 125 FIG. 13), by means of push buttons as described below, and by means of a display on the monitor of the computer (not shown) to which the peripheral device according to the present invention is connected.

The first video camera 3, which can oscillate about the rotation pivot 105, is moved by the motor 108 by means of a rotary screw and nut coupling formed by the endless screw 122 and a female screw 126. The female screw 126 consists of a plate 127, of plastic material for example, having a counter-threaded hole for the endless screw 122. The plate 127 has on its sides a pair of pins 128, each of which is inserted slidably in a corresponding slot 129 formed in a corresponding orientation element 130 for transmitting the motion provided by the motor. Each orientation element 130, acting as a cam follower, is made in the shape of an inverted L-shaped plate, bent on its upper base and shaped to form a connecting bracket for fixing to the video camera 3. The fixing is achieved with screws indicated in a general way by 133, in a lower position and suitably off-centre with respect to the axis of rotation of the video camera on the pivot 105.

A bar 134, acting as an obstacle for light emitted, in the infrared range for example, from a pair of optical sights 135 and 137, projects downwards from the plate 128 of the female screw 126. The optical sights 135 and 137, which are supported rigidly on the folding arm 101 on the same bracket 106 by means of support members 138, are controlled by a light-operated switch (not shown), and are used to regulate the limit of travel for the orientation of the video camera 3.

Figure 15:
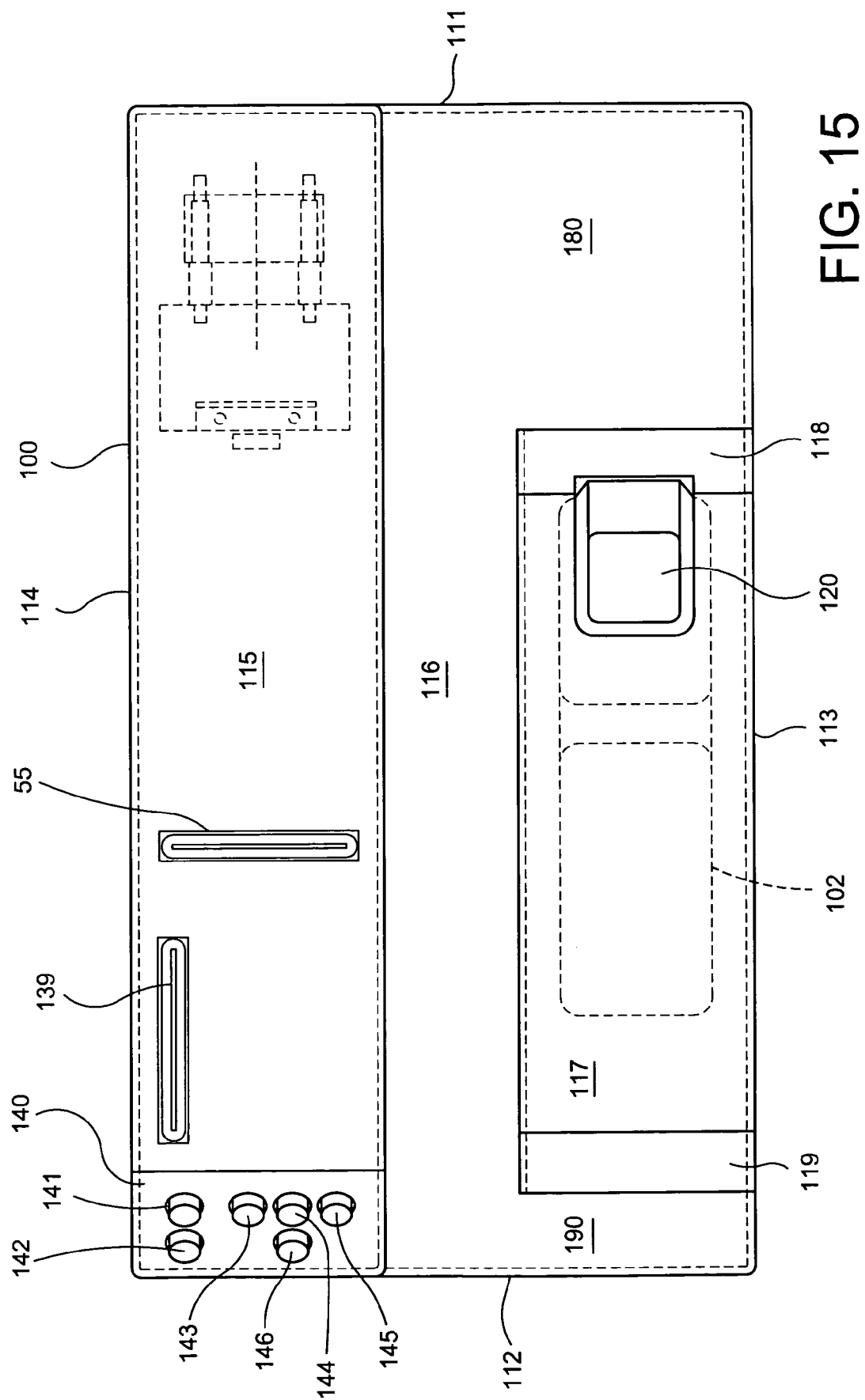
FIG. 15 shows a schematic plan view from above of the second embodiment of the peripheral device of FIG. 10, without the folding arm.

With reference to FIG. 15, a second video camera 4, acting as a scanner, is provided inside the casing of the peripheral according to the present invention, under the raised portion 115, for the acquisition of the personal characteristics of the person requesting the document.

The card 8 (or 8') described above, which records the personal characteristics, such as a signature or photograph, can be inserted through a slot 55 into a vertical slider (not shown) of the same type as that described with reference to the first embodiment, facing the second video camera 4 FIG. 15) with a corresponding lighting unit.

As shown in FIGS. 10 and 15, ventilation slots indicated in a general way by 107 are provided in the front wall 111 and rear wall 112, for cooling the interior of the casing 100. In this way, the heat generated by the second video camera 4 is removed by means of an internal fan, which is not shown, creating a flow of air between the front wall 111 and the rear wall 112 of the casing 100.

A second slot 139 for a smart card writer, designed to receive a storage medium to which the personal data of the person requesting the identity document can be written, is formed, again in the raised portion 115 of the casing 100. The smart card writer, being of the same type as that used as the recognition device in the first embodiment of the invention, is not shown, and can be of a conventional type.

Figure 16:
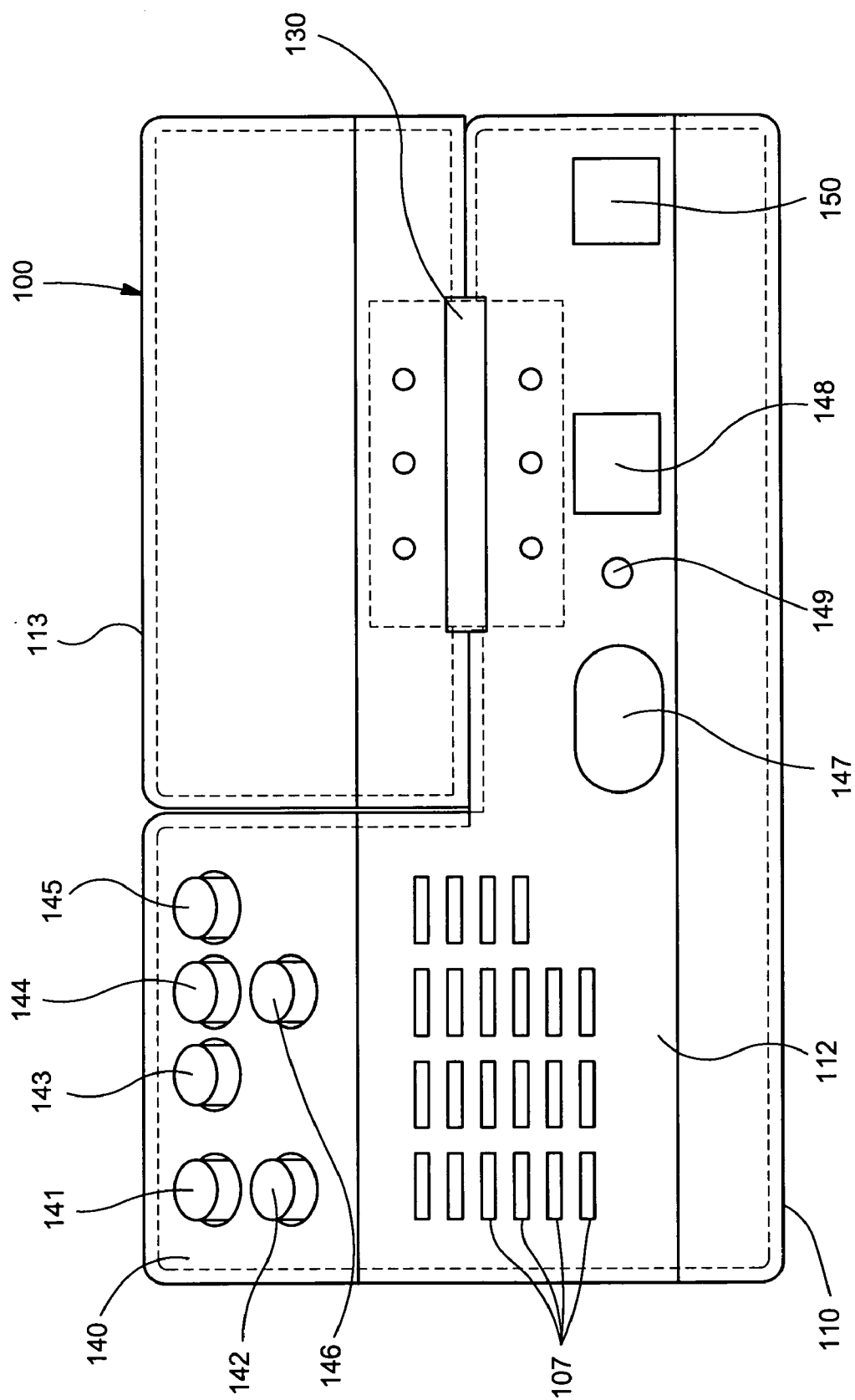
FIG. 16 shows a schematic rear view of the second embodiment of the peripheral device of FIG. 10.

An operating panel for the peripheral is provided in an advantageously inclined portion 120 of the rear wall 112 of the casing. As shown in FIG. 16, the control panel comprises operating buttons, indicated by 141 and 142, for orientating the first video camera 3 an operating button 144 for the first video camera 3, an operating button 143 for the second video camera 4, acting as a scanner for the signature and photograph of the person requesting the document, carried on the card inserted into the slot 139, an operating key 145 for the fingerprint reader and an operating button 146 for the lighting unit of the first video camera 3.

A lighting connector 147 operated by a switch 148 and with an LED 149 indicating its operation is provided adjacent to the control panel. The number 150 identifies a data connector for a cable providing a connection to the computer.

The general operation of the peripheral device according to the second embodiment is similar to that of the first embodiment.

In particular, in order to photograph the face of the person requesting the document, the video camera 3 is orientated upwards and downwards by means of the rotation buttons 141 and 142, which operate the motor 108. The motor 108 makes the plate 127 of the female screw 126 move along the endless screw 122. The pins 128 of the plate 127 also move, and this then causes the movement of the motion transmission elements 130 in whose slots 129 the pins 128 are inserted, thus causing the rotation of the video camera 3 to which these elements are rigidly connected. The inclination of the video camera 3 is displayed on the monitor of the computer and continues until the face of the person to be identified is exactly centred.

Figure 17:
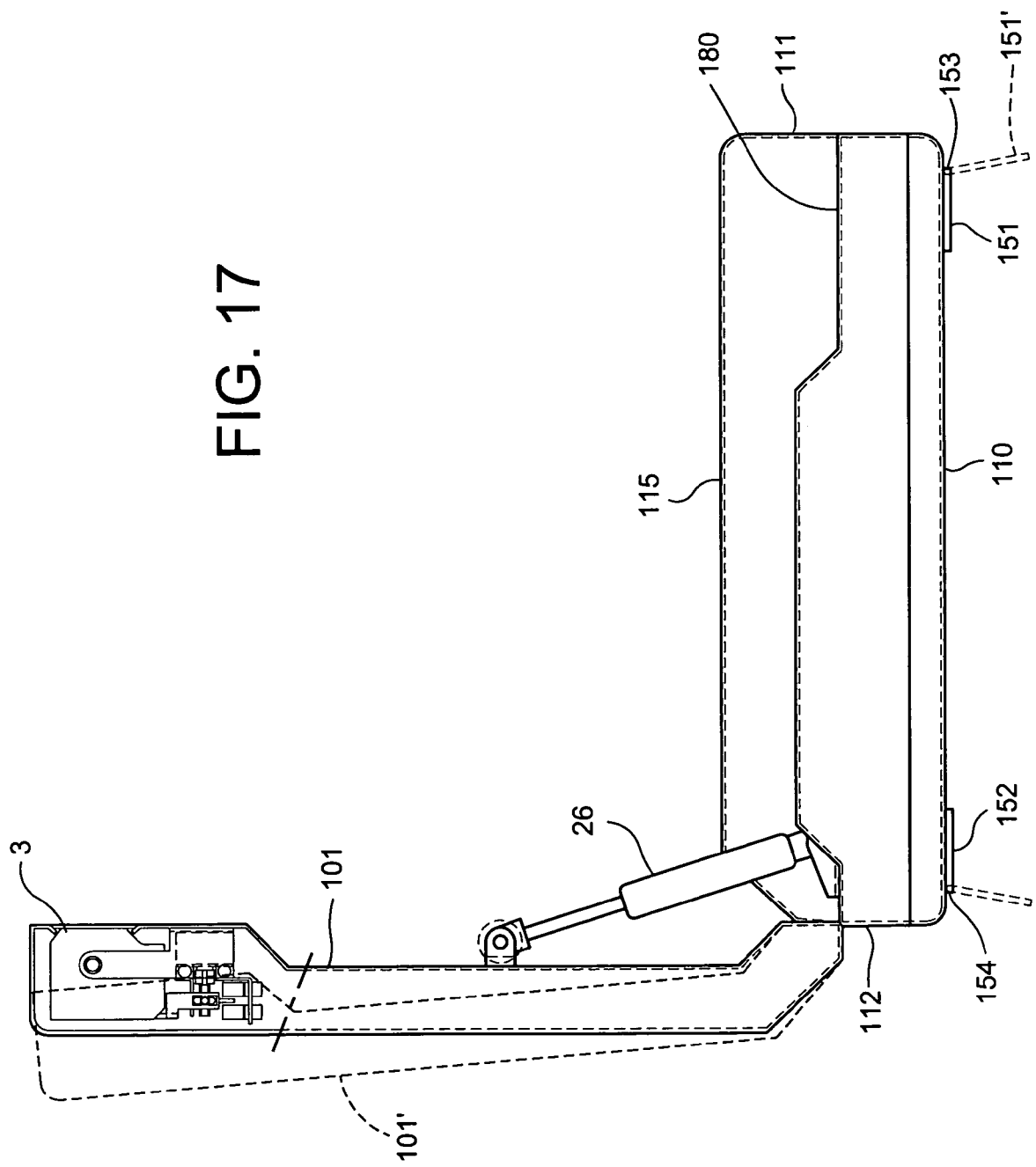
FIG. 17 shows, in a partially sectional side view, a first variant of the second embodiment of the peripheral device.

As shown in FIG. 17, foldable supports, the front ones being indicated by 151 and the rear ones by 152, are fitted to the base 110 of the casing 100. The two supports 151 and 152, shown schematically as bars pivoted about the axes 153 and 154, can be used to raise the position of the peripheral device above the supporting surface and to modify its inclination with respect to this surface. If only the front supports 151 were rotated from the position parallel to the base plane 100 to a downward facing position, shown in broken lines and indicated by 151', the whole peripheral device would be inclined backwards (for the sake of simplicity, only the inclination of the folding arm 101 to 101' is shown in FIG. 17). Thus the shooting range of the first video camera 3 can be increased and modified.

Figure 18:
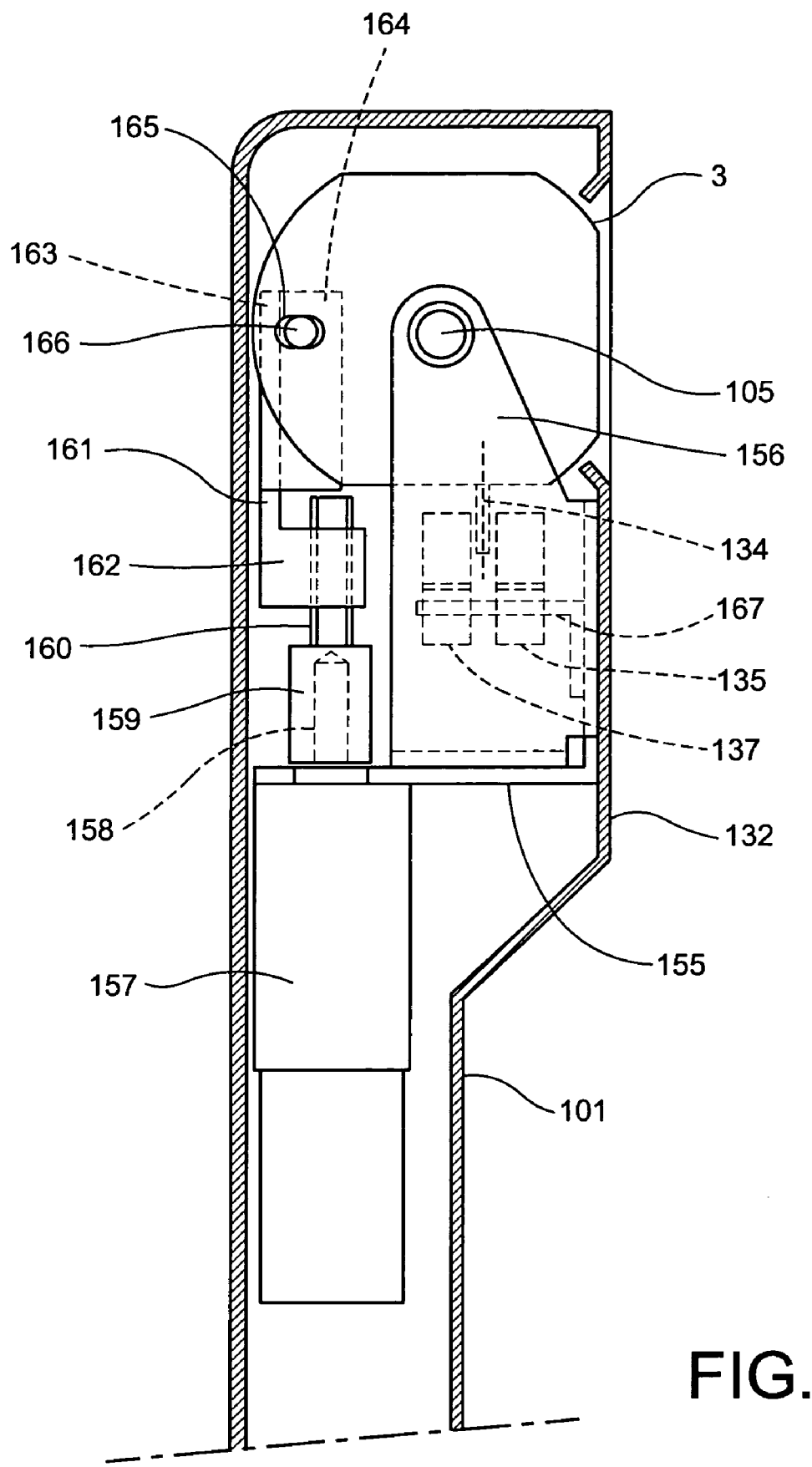
FIG. 18 shows, in a partial enlarged section of a folding arm, a second variant of the second embodiment of the peripheral device.

FIG. 18 shows a second variant of the second embodiment, relating particularly to the provision for the inclination of the first video camera 3.

A support plate 155 is fixed horizontally inside the thickened portion 132 of the folding arm 101.

The first video camera 3 is mounted so that it can be orientated, as in the second embodiment described above, by means of a pivot 105 supported by a support bracket 156. The video camera 3 is orientated by means of a motor 157 fixed to the supporting base 155 in such a way that its shaft 158 passes through the said supporting base 155. The shaft 158 is coupled by means of a joint 159 to an endless screw 160.

The motor 108 is operated in a similar way to that of the second embodiment.

The first video camera 3, which can oscillate about the rotation pivot 105, is moved by means of the motor 157, through a rotary screw and nut coupling formed by the endless screw 160 and a female screw 161. The female screw 161 consists of a block 162, of plastic material for example, having a counter-threaded hole for the endless screw 160, and an orientation element 163. The orientation element 163 has a C-shaped structure having a slot 165 in each of its arms 164. A pin 166, which is laterally integral with the video camera 3, is accommodated in each of the slots 165. Clearly, the coupling of the orientation element 163 to the pins 166 permits the controlled oscillation of the video camera 3.

A bar 134, acting as an obstacle to light emitted, in the infrared range for example, by a pair of optical sights 135 and 137, identified by the same reference numbers as those used for the second embodiment, projects downwards from the video camera 3. The optical sights 135 and 137 are rigidly supported on the folding arm 101 by a bracket 167, are controlled by a light-operated switch (not shown) and are used to regulate the limit of travel for the orientation of the video camera 3.

The arrangement described with reference to the second variant of FIG. 18 has the advantage of making it possible to use a motor 157 which could be an ordinary electric motor, because of its longitudinal position with respect to the folding arm 101.

FIG. 19 shows a third variant of the second embodiment. This third embodiment is designed to regulate the inclination of the first video camera 3, which is mounted in a fixed way inside the thickened portion 132 of the folding arm 101.

As in the preceding embodiments, the folding arm 101 is kept in the vertical position by the opposing action of the gas spring 26 pivoted between the upper surface of the lowered portion 116 of the casing 100 and the folding arm 101, on the pivots 27 and 28 respectively. In this variant in FIG. 19, the pivot 27 is mounted on a slider 168 movable in an aperture 169 formed in the lowered portion 116. The slider 168 has a threaded hole in its underside, capable of accommodating, inside the casing 100, the endless screw 170 coupled by a joint 171 to the shaft 158 of a motor 157.

When the folding arm 101 is closed (position not shown in FIG. 19), the slider 168 is located on the endless screw in the position nearest the motor 157, as shown in FIG. 19. When the folding arm is opened, by releasing the closing means such as those indicated by 124 and 125 in FIG. 10, the gas pump 26 is regulated in such a way that its rod is extended and places the folding arm 101 in the position shown in solid lines in FIG. 19. To give the folding arm the desired inclination for photographing with the first video camera 3, the motor 157 is operated and, as in the second variant, moves the slider 168 to the desired position as a result of the coupling between the slider and the endless screw. The position of maximum inclination is indicated in broken lines in FIG. 19.

The arrangement described with reference to FIG. 19 causes fewer design problems, since the first video camera 3 is mounted in a fixed way inside the folding arm and its position is set by the inclination of the folding arm 101.

The advantages of the invention are easily understood. All the biometric and personal data of the person requesting the document can be acquired with a single compact and easily transportable piece of equipment. This can be done easily and rapidly, making it unnecessary to use a multiplicity of separate pieces of equipment, with the consequent problems of connecting data transmission and power supply cables, or to use supports for aiming the video camera.

As will have been noted in the course of the description, the invention, in its various embodiments, provides design solutions which enhance the transportability and protection of its components during transport. Arrangements have been devised to protect the video camera, the lamps and the fingerprint reader.

The device can also be reliably changed from the closed to the open configuration. In its open configuration, the device is highly stable and functional. The casing supports the whole assembly, while the folding arm becomes a robust support for the external video camera.

Clearly, the configurations and design solutions chosen for the peripheral device according to the invention may be different from those which have been described and illustrated. Additionally, the operator recognition device can be of a different type, and can use other biometric data, such as fingerprints.

I claim:

1. Peripheral device for acquiring biometric and personal data, which, in particular, acts as an interface device with a main computer for the preparation of recognition documents, comprising, in a single casing:
   a first video camera for the live photography of a person requesting the document;
   an external lighting unit adjacent to the first video camera;
   a guide and support frame fixed inside the casing;
   an entry slot formed in the casing, said entry slot leading to said guide and support frame;
   a second video camera, acting as a scanner, located inside the casing, for the acquisition of personal characteristics shown on a backing card, insertable into said entry slot, for video digitization, said guide and support frame positioned to support said backing card in visual communication with said second camera;
   an internal lighting unit adjacent to the second video camera, for illuminating the backing card;
   a video source switch for switching the signals from the first video camera and the second video camera;
   a power supply unit operated by a switch and connected to a distributor of power to the recognition device, and to the first and second video cameras; and
   a data connector for the connection to the main computer.

2. Peripheral device according to claim 1, wherein said backing card for video digitization has, on one face, a first area for the application of a photograph of the person requesting the identity document, and a second area for the writing of said person's signature.

3. Peripheral device according to claim 2, wherein said first area for the application of the photograph is covered with an adhesive substance protected by a removable flap.

4. Peripheral device according to claim 1, further comprising a smart card reader/writer device in the single casing for recognizing an operator and authorizing him to use the equipment.

5. Peripheral device according to claim 1, further comprising a smart card reader/writer device in the single casing writing a recognition document for a person requesting it.

6. Peripheral device according to claim 1, further comprising, in the same casing, a fingerprint reader for acquiring the person's prints, connected for transmission of the corresponding signals to the video source switch; the fingerprint reader being connected to the power supply unit for its power supply.

7. Peripheral device according to claim 1, wherein said casing is portable and is of parallelepipedal shape, including a base, front, rear and side walls, and, on the upper face, a raised portion and at least one lowered portion housing, in the closed position, a folding arm pivoted on the rear wall of the casing and provided with a lock at its front; the folding arm having an upper surface coplanar with the upper surface of the raised portion, and carrying the first video camera facing in the direction opposite the aforesaid upper surface.

8. Peripheral device according to claim 7, further comprising a gas spring that is pivotable between the upper face of the casing and the folding arm.

9. Peripheral device according to claim 7, wherein said folding arm is of parallelepipedal shape and the first video camera is mounted on a slider that is slidable in a guide housed within the folding arm and which is adjustable as to its position along the folding arm.

10. Peripheral device according to claim 7, wherein said folding arm has a thickened end portion, provided with an aperture and housing the first video camera.

11. Peripheral device according to claim 10, wherein said first video camera is mounted so that it can be orientated about an axis of rotation which is parallel to the axis of rotation of the folding arm.

12. Peripheral device according to claim 11, wherein the orientation of the first video camera, regulated by limit of travel devices, is servo-assisted by a motor whose shaft is connected to an orientation element connected to the first video camera by a suitable arm with respect to its axis of rotation.

13. Peripheral device according to claim 12, wherein said limit of travel devices includes a pair of optical sights integral with the folding arm.

14. Peripheral device according to claim 10, wherein said first video camera is mounted in a fixed way and the folding arm is provided with a gas spring pivoted below on a slider engaged with a motor.

15. Peripheral device according to claim 1, wherein said data connector is a USB connector, said video source switch receives signals from at least said first video camera and said second video camera, and said signals are sent to said USB data connector through a video digitizer.

16. Peripheral device according to claim 1, further including a smart card reader/writer device in the single casing.

17. The peripheral device according to claim 1, wherein the recognition documents include identity cards.

* * * * *